Oct. 21, 1969  A. PITNER  3,473,857

ROLLED AND WELDED ROLLING BEARING CAGE

Filed Nov. 28, 1967

United States Patent Office 3,473,857
Patented Oct. 21, 1969

3,473,857
ROLLED AND WELDED ROLLING BEARING
CAGE
Alfred Pitner, Paris, France, assignor of one-half to Nadella S.A., Rueil-Malmaison, France, a French body corporate
Filed Nov. 28, 1967, Ser. No. 686,255
Claims priority, application France, Jan. 3, 1967, 89,746
Int. Cl. F16c 19/20, 33/48
U.S. Cl. 308—217        3 Claims

ABSTRACT OF THE DISCLOSURE

A welded cage for a needle or roller bearing in which at least the peripheral marginal portions of the cage are radially offset and the contiguous end portions are located in the region of a needle aperture and radially offset in a direction opposed to that of the marginal portions so that the weld bead is set back from the corresponding cylindrical surface of the cage.

---

Figure 1:
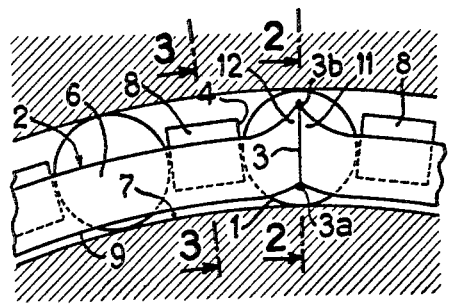

The present invention relates to cages for journal rolling bearings having needles or rollers which are obtained by rolling a plane apertured strip and by the welding of the contiguous ends of this strip.

When welding, there is always produced a slight bead which in some cases can remain in the finished cage with no inconvenience. However, this bead is troublesome when the cage has a thickness very nearly equal to the diameter of the rolling elements or has its edges outwardly or inwardly offset with respect to the cylindrical geometric surface containing the axes of the needles or rollers, for example to center this cage on the outer or inner raceway. These bent cages are in particular necessary when a large continuous force is exerted such as that which is due to centrifugal force in a connecting-rod big end or in a planet gear in an epicyclic gear train, or to inertia in elements undergoing reciprocating movement, for example in connecting-rod little ends.

It is relatively easy to eliminate this bead by crushing, but such an operation has the drawback of elongating the marginal portions and modifying the distance between the corresponding bars. It could also be arranged to place this bead at the bottom of a space defined by chamfers formed at the end of the peripheral marginal portion, but the operation is costly and also has the disadvantage of reducing the section.

When the centering is effected by means of the outer face of the cage, the bead can be eliminated in a relatively easy way, for example by a striking or cutting off operation.

When the centering is achieved by means of the inner face of the cage, the bead is difficult to eliminate.

The object of the invention is to avoid the drawbacks related to the presence on the cage of the bead resulting from the weld without complicating cage production.

The invention provides a cage for a journal needle or roller bearing obtained by rolling a plane apertured strip and welding the contiguous end portions of this strip, at least the peripheral marginal portions of the cage being radially offset with respect to the cylinder described by the axis of the needles, the contiguous end portions of said marginal portions being located in the regions of an aperture and said end portions of said marginal portions being radially offset in a direction opposed to that of said marginal portions whereby on one of the faces of the cage the weld bead is set back from the corresponding cylindrical surfaces of the cage.

This cylindrical surface can therefore centre the cage on the adjacent raceway without the weld bead coming in contact with the raceway.

Further features and advantages of the invention will be apparent from the ensuing description with reference to the accompanying drawing.

Figure 2:
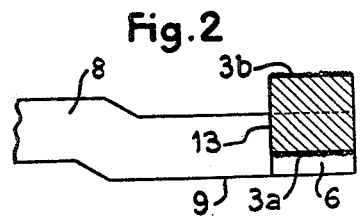
Figure 4:
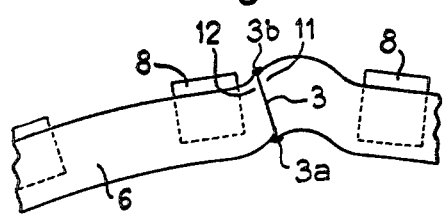
Figure 3:
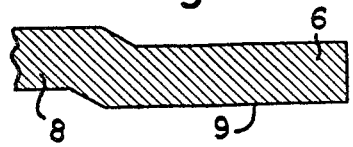

In the drawing:

FIG. 1 is a partial cross-sectional view of a needle bearing showing a welded joint of a cage according to the invention mounted in a needle bearing;

FIGS. 2 and 3 are half sectional views taken along lines 2—2 and 3—3 of FIG. 1; and FIG. 4 is a partial side elevational view of a modification of the cage shown in FIG. 1.

In the needle bearing 1 shown in FIG. 1, the cage is obtained by welding at 3 in the region of an aperture 4 the contiguous ends of a rolled strip. This weld 3 therefore interconnects the peripheral marginal portions 6 of the cage which are radially offset in the direction of the inner raceway 7 with respect to the bars 8 so that this raceway can center the cage. Note that these peripheral marginal portions 6 define the ends of the apertures 4 receiving the needles of the bearing. Only one portion 6 is shown in the half-sectional views of FIGS. 2 and 3. To ensure that the bead 3a of the welded joint 3 on the inner face 9 of the marginal portions 6 does not tend to come in contact with the race 7, the end region 11 or 12 of the marginal portions 6 of the welded strip is curved with a curvature opposed to that of the cage itself. The weld bead 3a of the joint 3 is thus radially outwardly set back with respect to the inner cylindrical face 9 of the marginal portions 6.

Whereas in FIG. 1 the welded joint 3 is formed in the median diametral plane of the aperture 4, in the embodiment shown in FIG. 4 this joint is offset with respect to this plane so that the end regions 11 and 12 of the marginal portions 6 are curved in accordance with unequal arcs. This arrangement has the advantage of avoiding the presence of the weld on the plane lateral face 13 of the marginal portion in the region thereof in contact with the end of the needle and also the advantage of locating the weld bead 3b within the cylinder tangent to the upper part of the curved portion 11, which is of advantage in some cases.

Having now described my invention what I claim as new and desire to secure by Letters Patent is:

1. In a rolling journal bearing comprising needles or rollers and a cage for said needles or rollers, said cage being a rolled initially plane strip having needle or roller receiving apertures circumferentially defined by bars and peripheral marginal portions axially defining said apertures, said marginal portions having contiguous end regions interconnected by a weld having a weld bead and said peripheral marginal portions of the cage being radially offset with respect to the cylinder described by the axis of the needles or rollers; the feature that said contiguous end regions of said marginal portions are located in the region of one of said apertures and said end regions of said marginal portions are entirely radially offset in a direction opposed to that of said marginal portions whereby on one of the faces of the cage said weld bead is radially set back from the corresponding cylindrical surface of the cage.

2. A rolling journal as claimed in claim 1, wherein said weld is located in the median diametral plane of said one of said apertures.

3. A rolling journal as claimed in claim 1, wherein said weld is circumferentially offset with respect to the median diametral plane of said one of said apertures.

References Cited

UNITED STATES PATENTS 2,294,289 8/1942 Frauenthal.
2,642,517 6/1953 Lindow _____ 29—481

MARTIN P. SCHWADRON, Primary Examiner

F. SUSKO, Assistant Examiner